United States Patent [19]
Winget

[11] Patent Number: 6,164,953
[45] Date of Patent: *Dec. 26, 2000

[54] METHOD AND MOLD TO MAKE PLASTIC ARTICLES HAVING REDUCED SURFACE DEFECTS AND ASSEMBLY FOR USE THEREIN

[75] Inventor: Larry J. Winget, Leonard, Mich.

[73] Assignee: Patent Holding Company, Fraser, Mich.

[ * ] Notice: This patent is subject to a terminal disclaimer.

[21] Appl. No.: 09/141,884

[22] Filed: Aug. 28, 1998

Related U.S. Application Data

[63] Continuation-in-part of application No. 09/041,333, Mar. 12, 1998, Pat. No. 6,042,361.
[51] Int. Cl.[7] ................................................. B29C 33/10
[52] U.S. Cl. ..................... 425/546; 264/328.1; 425/556; 425/577; 425/812
[58] Field of Search ..................................... 425/130, 444, 425/546, 556, 577, 812; 264/572, 328.1

[56] References Cited

U.S. PATENT DOCUMENTS

| 3,555,620 | 1/1971 | Bucy | 425/149 |
|---|---|---|---|
| 3,645,492 | 2/1972 | Edlis | 249/68 |
| 4,009,978 | 3/1977 | Hanning | 425/444 |
| 4,123,218 | 10/1978 | Krall | 425/535 |
| 4,531,703 | 7/1985 | Underwood | 425/577 |
| 5,169,577 | 12/1992 | Feichtinger | 264/517 |
| 5,217,729 | 6/1993 | Terauchi et al. | 425/812 |
| 5,284,429 | 2/1994 | Schneider et al. | 425/130 |
| 5,316,605 | 5/1994 | Rakonjac et al. | 156/245 |
| 5,342,191 | 8/1994 | Shah et al. | 425/535 |
| 5,356,281 | 10/1994 | Katsuno et al. | 425/208 |
| 5,431,873 | 7/1995 | Vandenberghe | 425/812 |
| 5,516,551 | 5/1996 | Anderson et al. | 427/195 |
| 5,545,366 | 8/1996 | Lust et al. | 425/556 |
| 5,599,630 | 2/1997 | Smith et al. | 428/313 |
| 5,635,221 | 6/1997 | Han | 425/546 |
| 5,665,281 | 9/1997 | Drummond | 425/812 |
| 5,730,926 | 3/1998 | Matsumoto et al. | 425/130 |

FOREIGN PATENT DOCUMENTS

| 51-24673 | 2/1976 | Japan . | |
|---|---|---|---|
| 55-91639 | 7/1980 | Japan . | |
| 2-62218 | 3/1990 | Japan | 425/556 |
| 3-93515 | 4/1991 | Japan . | |
| 3-222713 | 10/1991 | Japan | 425/556 |
| 5-74827 | 3/1993 | Japan | 425/444 |

Primary Examiner—Robert Davis
Attorney, Agent, or Firm—Brooks & Kushman P.C.

[57] ABSTRACT

A method and mold and assembly for use in the mold are provided to make plastic articles having reduced surface defects wherein gases and/or volatiles normally trapped at at least one surface of the article are absorbed by at least one porous part to degas the at least one surface. In one embodiment, first and second porous parts such as porous metal parts can be fit within the first and second mold halves, respectively, to degas opposite surfaces of the article while preventing the passage of plastic from the article-defining cavity in the closed position of the mold. In a second embodiment, a sintered metal plug is utilized to locally degas a single surface of the article. In a third embodiment, an ejector pin and a core pin are formed from sintered metal to degas spaced local surfaces on the same side of the article. The porous metal parts may be sized so that the porous metal parts help to form at least one "Class A" surface formed in the article-defining cavity so that the article can be used in applications which require such Class A surfaces such as in automotive applications.

13 Claims, 2 Drawing Sheets

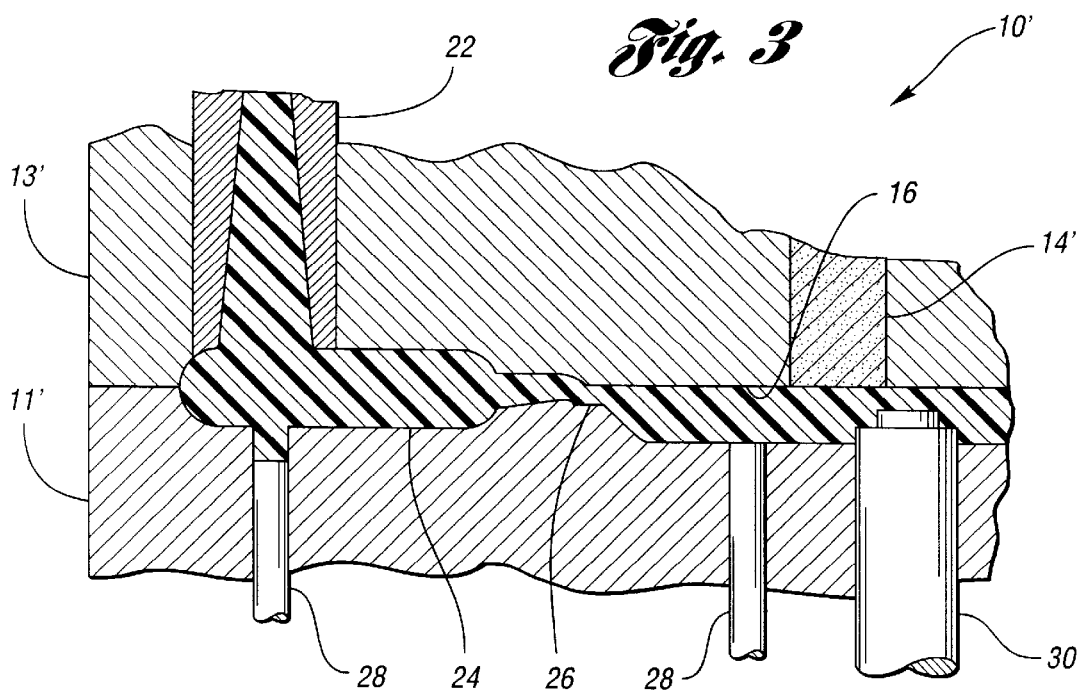
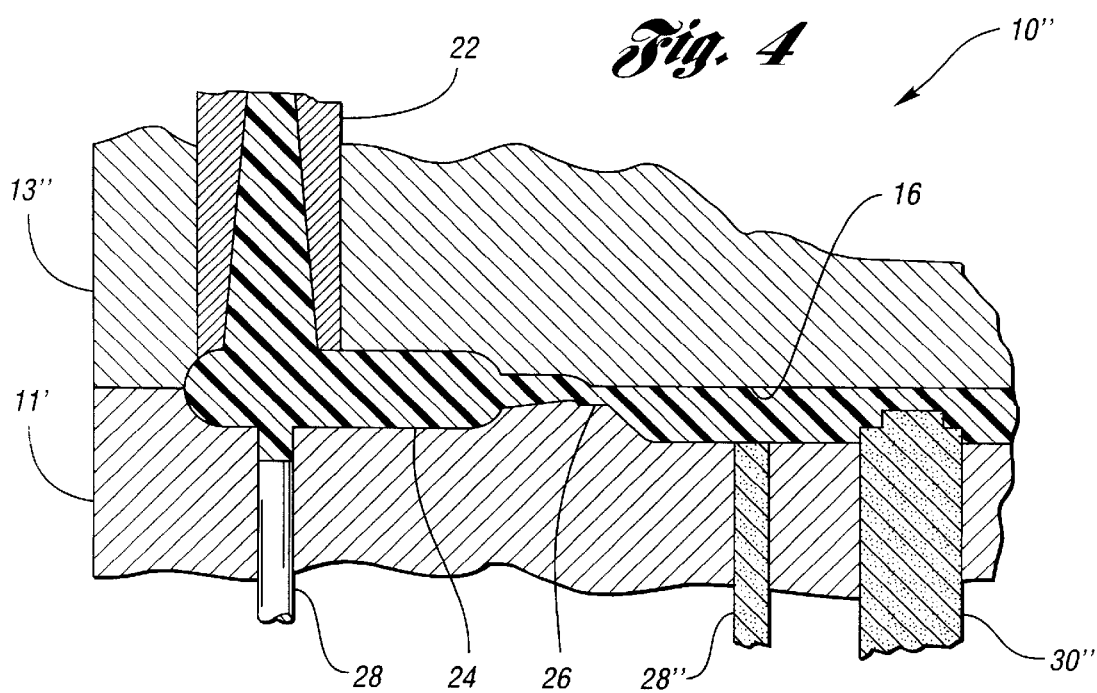

METHOD AND MOLD TO MAKE PLASTIC ARTICLES HAVING REDUCED SURFACE DEFECTS AND ASSEMBLY FOR USE THEREIN

CROSS-REFERENCE TO RELATED APPLICATION

This application is a continuation-in-part application of U.S. patent application entitled "Mold For Use In A Plastic Injection Molding System And Venting Pin Assembly For Use Therein" filed Mar. 12, 1998 and having U.S. Ser. No. 09/041,333 and now U.S. Pat. No. 6,042,361.

TECHNICAL FIELD

This invention relates to methods and molds for making plastic articles having reduced surface defects and assemblies for use therein and, in particular, to methods and molds to make plastic articles having reduced surface defects and assemblies for use therein wherein gases normally trapped at a surface of the article are absorbed to degas the surface.

BACKGROUND ART

During a plastic molding/compression process, gases are often trapped in the mold thereby adversely affecting the appearance, structure and performance of the article as illustrated in FIG. 2 wherein reference numeral 100 indicates surface imperfections and reference numeral 102 indicates non-fill areas of the article.

For example, as described in U.S. Pat. Nos. 5,516,551 and 5,599,630, sheet molded compound (SMC) parts often have volatiles and/or gases contained therein which, during processing of the part, migrate to the surface of the part. A resin-rich layer adjacent the surface of the part can oftentimes partially block passage of gases from internal voids formed within the SMC articles. However, many processes can disrupt this resin-rich layer to expose these internal voids to the surface of the article.

It is also often necessary to vent the air out of the article-defining cavity of a plastic injection mold, either during a plastic injection step, during a pressurized gas injecting step, or during a step of venting gas from a gas-assisted injection molded part. Prior attempts to vent the cavity are often expensive and/or complex.

U.S. Pat. No. 5,665,281 discloses a method of molding using a venting pin which, in one embodiment, can also serve as an ejector pin.

U.S. Pat. No. 3,555,620 discloses a mold for pressure injected materials in which the ejector pins and their associated board acts as a venting means.

U.S. Pat. No. 5,356,281 discloses a stack mold, including gas ejection of pieces having a reciprocable gas blow-off pin slidably trapped in a pin recess and including an enlarged bottom portion and a narrow upper portion that includes an internal gas passage.

U.S. Pat. No. 5,545,366 discloses an arrangement for molding in which one ejector pin is located at the distal end of a part to ensure adequate mold gas venting during the final fill stage.

U.S. Pat. No. 4,123,218 discloses a blow pin assembly having a narrow gap between a main body and a sleeve to provide a vent for trapped air.

U.S. Pat. No. 3,645,492 discloses an ejector actuator for a plastic injection mold for introducing air or other fluid into an associated cylinder.

U.S. Pat. No. 4,531,703 discloses an air ejector which moves an ejector valve into the mold and injects air between a molded article and the mold to eject the article.

The U.S. patent to Schneider et al., 5,284,429, discloses a mold and gas pin assembly for use in the injection molding of a thermoplastic article. A fluid supply passageway is provided in the mold to allow fluid to be ejected through and communicated to either the thermoplastic flow path or into the article-defining cavity. An end passage of the thermoplastic flow path has a plug disposed therein. The plug includes a porous core which permits the flow of low viscosity fluid such as a gas in either direction therethrough, but prevents the passage of molten thermoplastic therethrough.

U.S. Pat. Nos. 5,169,577, 5,316,605 and 5,217,729 all disclose the use of gas permeable parts for forming plastic articles.

SUMMARY OF THE INVENTION

An object of the present invention is to provide a method and a mold for making plastic articles having reduced surface defects and an assembly for use therein wherein gases normally trapped in a mold during the plastic molding/compression process are removed to enhance the appearance, structure and performance of the article.

Another object of the present invention is to provide a method and a mold for making plastic articles having reduced surface defects and an assembly for use therein wherein the invention can be utilized in a number of molding processes such as for SMC body panels, injection moldings such as various automotive parts as well as in reaction injection molding processes.

In carrying out the above objects and other objects of the present invention, a method for use in a plastic molding system is provided to make plastic articles having reduced surface defects. The mold includes a first mold half and a second mold half. The first and second mold halves are movable relative to each other between an open position and a closed position. The mold also includes at least one porous part fit within at least one of the mold halves and which at least partially defines an article-defining cavity in the closed position of the mold. The at least one porous part absorbs gas trapped at at least one surface of the article in the closed position of the mold to degas the at least one surface, but prevents passage of plastic from the article-defining cavity wherein surface defects of the plastic article are reduced.

Still further in carrying out the above objects and other objects of the present invention, in a mold having a first mold half and a second mold half movable relative to each other between an open position and a closed position, an assembly is provided to allow the mold to make plastic articles having reduced surface defects. The assembly includes a first porous part adapted to fit within one of the first mold halves to at least partially define an article-defining cavity in the closed position of the mold and a second porous part adapted to fit within one of the mold halves to at least partially define the article-defining cavity in the closed position of the mold. The first and second porous parts absorb gas trapped it the first and second surface, respectively, of the article in the closed position of the mold to degas the first and second surfaces but prevents the passage of plastic from the article-defining cavity wherein surface defects of the plastic article are reduced.

Yet still further in carrying out the above objects and other objects of the present invention, a method is provided for making plastic articles having reduced surface defects. The method includes the step of providing a mold as previously described, processing plastic in the article-defining cavity to form a plastic article, and allowing gases contained within the plastic article to migrate to a surface of the article in contact with the at least one porous part during the step of processing. The at least one porous part absorbs gases trapped at the surface of the article to degas the surface wherein surface defects of the plastic article are reduced.

Preferably, the at least one porous part comprises a sintered material such as from the group consisting of aluminum, copper, nickel, steel, bronze, porcelain, and brass.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a view similar to FIG. 1 except only a sintered metal plug is provided instead of the pair of porous parts to absorb gas normally trapped at one surface of the article; and FIG. 4 is a view similar to FIGS. 1 and 3 wherein both an ejector pin and a core pin are formed from a sintered material.

BEST MODE FOR CARRYING OUT THE INVENTION

Figure 1:
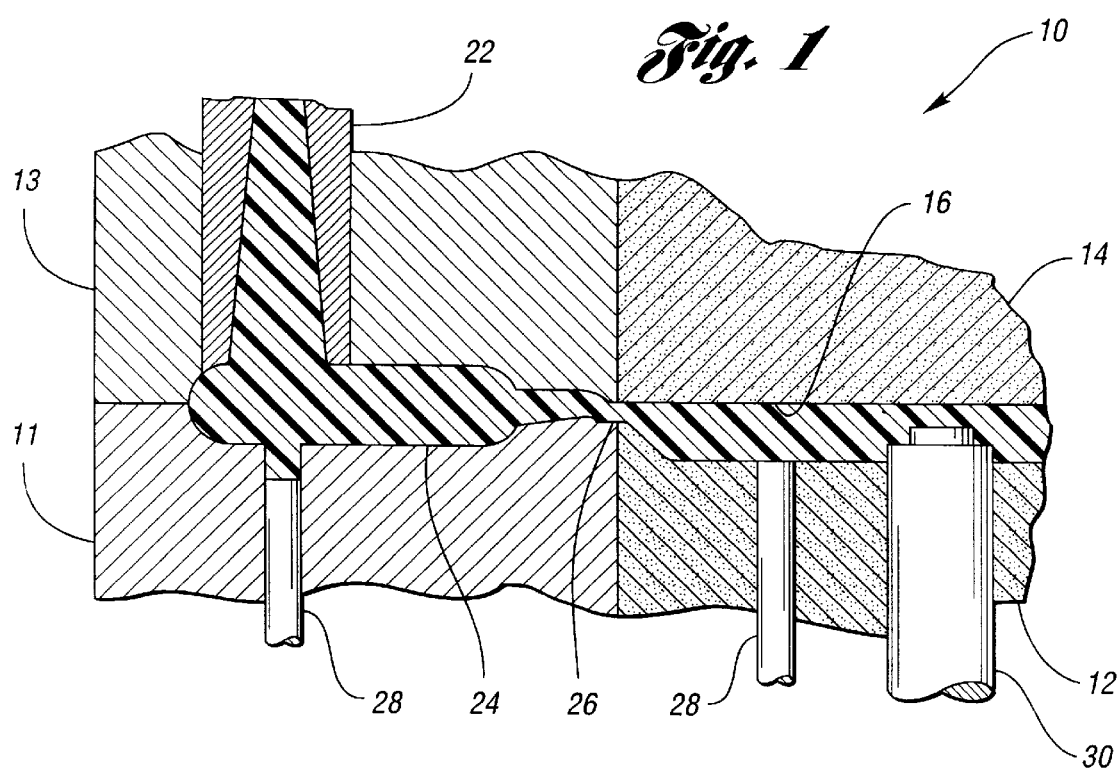
FIG. 1 is a view partially broken away and in cross-section of a mold constructed in accordance with the present invention including a pair of porous parts which substantially completely define the article-defining cavity and which absorb gases normally trapped at opposite surfaces of the article.
Figure 2:
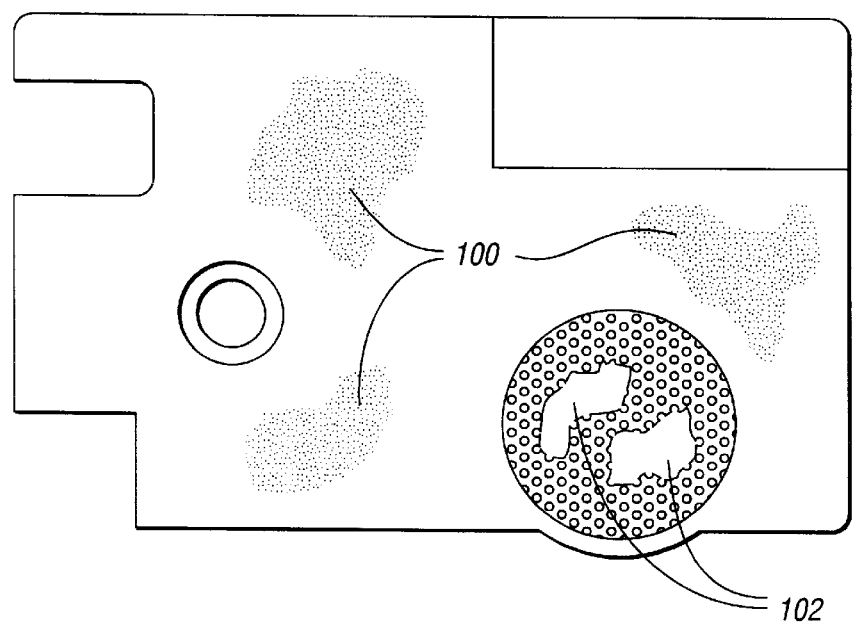
FIG. 2 is a schematic view of a plastic automotive part which exhibits surface imperfections and non-fill areas due to the problems which the present invention solves.

Referring now to the drawing Figures, there is illustrated in FIG. 1 a mold, generally indicated at 10, including first and second mold halves 11 and 13, respectively, and further including a pair of porous parts, generally indicated at 12 and 14, for use in a molding system. The porous parts 12 and 14 are fit and secured within the mold halves 11 and 13, respectively, such as by bolts (not shown). It is to be understood that the mold 10, the mold halves 11 and 13, and the parts 12 and 14 are shown in the drawing figures in a plastic injection molding system. It is to be understood that the invention may also be used in a reaction injection molding system, or a compression molding system. It is also to be understood that it may only be necessary to have a single porous part 12 or 14 in order to degas a plastic article.

The first and second mold halves 11 and 13, together with the porous parts 12 and 14, respectively, are movable relative to each other between an open position and a closed position as shown in FIG. 1 wherein the first and second porous parts 12 and 14, respectively, substantially totally define an article-defining cavity 16.

When the molding system comprises an injection molding system, as illustrated in FIG. 1, the second or stationary mold half 13 includes a sprue 22 for communicating thermoplastic material to a runner 24 which, in turn, communicates with the article-defining cavity 16 via a gate 26. A thermoplastic flow path is defined by the sprue 22, the runner 24, and the gate 26.

The first or movable mold half 11 includes ejector pins 28 and a core pin 30 which are of conventional design and which perform their intended functions in making plastic articles.

The first and second porous parts 12 and 14 are fit within the first and second mold halves 11 and 13, respectively, so that the first and second porous parts 12 and 14 absorb gas and volatiles trapped at first and second surfaces, respectively, of the article in the closed position in the mold to degas the first and second surfaces of the article. At the same time, the first and second porous parts 12 and 14 prevent the passage of plastic from the article-defining cavity 16. By such degassing of the surfaces of the part, surface defects of the plastic article are reduced. When the mold 10 is opened, the gases absorbed by the porous parts 12 and 14 are released at atmospheric pressure.

The first and second porous parts 12 and 14 typically comprise a sintered material such as aluminum, copper, nickel, steel, bronze, porcelain, and brass which absorb gas and/or volatiles trapped at surfaces of the article during processing thereof within the article-defining cavity 16 but prevent the passage of plastic out of the article-defining cavity 16. The first and second porous parts 12 and 14 are received and retained are otherwise fit within the first and second mold halves 11 and 13, respectively, in any well known fashion, such as by bolts.

The sintered material is preferably a sintered material which can absorb a substantial amount of gases/volatiles without the need for a vent hole through the mold half 11 or the mold half 13 in which the porous part 12 and 14, respectively, are fit. However, such a vent hole can be provided to fluidly communicate either one or both of the porous parts 12 and 14 with atmospheric pressure if desired.

When forming a "Class A" surface on the article formed within the article-defining cavity 16, the micron size should be sufficiently small to provide such a "Class A" surface yet at the same time, absorb the volatiles and/or gases normally trapped at the surface of the article.

Referring now to FIG. 3, there is illustrated a second embodiment of the present invention where parts which are the same as those in the first embodiment have the same reference numeral and parts which perform the same or similar function have the same reference numeral but a single prime designation.

For example, the mold halves 11 and 13 are replaced by mold halves 11' and 13', respectively, of a mold 10' since porous parts 12 and 14 are not used. In the place of the parts 12 and 14, a single sintered metal plug 14' is used to locally degas a portion of an upper surface of the article in the article-defining cavity 16.

Referring now to FIG. 4, there is illustrated a third embodiment of the present invention wherein parts which are the same as those in the first two embodiments have the same reference numeral and parts which perform the same or similar function have the same reference numeral but a double prime designation. For example, the porous parts 12 and 14 are eliminated from the first embodiment and the porous part 14' is eliminated for the second embodiment while keeping the first mold half 11' of the second embodiment. Consequently, the second mold half 13" is different from the mold halves 13 and 13' of the first and second embodiments, respectively.

In the third embodiment of FIG. 4, the one of the ejector pins 28 and the core pin 30 have been replaced by a sintered metal ejector pin 28" and a sintered metal porous core pin 30" to again locally degas a pair of surfaces on the same side of an article in the article-defining cavity 16.

The method and molds 10, 10' and 10" for making plastic articles having reduced surface defects as described above provide numerous advantages. For example, the method and mold 10, 10' and 10" and assembly of porous parts (i.e., 12 and 14; 14'; and 28" and 30") enhance the appearance, structure and performance of the resulting article by absorbing gases and/or volatiles normally trapped in the molds 10, 10' and 10" during the molding/compression process. As previously noted, the molding process can produce articles such as SMC body panels, plastic automotive parts such as A, B, C, and D pillars, as well as reaction injection molded parts.

Also, the porous parts 12, 14, 14', 28" and 30" can be exchanged for other porous parts having other sized pores which may be of a different material for various requirements for gas/volatile absorption while at the same time preventing passage of molten plastic out of the article-defining cavity 16.

While the best mode for carrying out the invention has been described in detail, those familiar with the art to which this invention relates will recognize various alternative designs and embodiments for practicing the invention as defined by the following claims.

What is claimed is:

1. A mold for use in a plastic molding system to make a plastic article having reduced surface defects, the mold comprising:

a first porous mold part;

a second porous mold part, the first and second mold parts being movable relative to each other between an open position and a closed position; and at least one of the porous mold parts defining an article-defining cavity in the closed position of the mold, the at least one of the porous mold parts absorbing gases trapped at at least one exterior surface of the plastic article immediately adjacent the at least one of the porous mold parts in the closed position of the at least one of the porous mold parts to degas and form the at least one exterior surface, but preventing the passage of plastic from the article-defining cavity wherein surface defects of the plastic article are reduced and wherein the at least one of the porous mold parts releases the absorbed trapped gases in the open position of the at least one of the porous mold parts.

2. The mold as claimed in claim 1 wherein the at least one porous mold part forms at least one "Class A" degassed surface on the article formed in the article-defining cavity.

3. The mold as claimed in claim 1 wherein the plastic article has opposite first and second surfaces and the first porous mold part and the second porous mold part cooperate to degas the first and second surfaces, respectively, on opposite sides of the article in the closed position of the mold.

4. The mold as claimed in claim 1 wherein the at least one porous mold part comprises a sintered material.

5. The mold as claimed in claim 4 wherein the sintered material is selected from the group consisting of aluminum, copper, nickel, steel, bronze, porcelain, and brass.

6. The mold as claimed in claim 1 wherein the at least one porous mold part includes an ejector pin.

7. The mold as claimed in claim 1 wherein the at least one porous mold part includes a core pin.

8. In a mold having a first mold half and a second mold half movable relative to each other between an open position and a closed position, an assembly to allow the mold to make plastic articles having first and second exterior surfaces with reduced surface defects, the assembly comprising:

a first porous part adapted to fit within one of the mold halves to at least partially define an article-defining cavity in the closed position of the mold; and a second porous part adapted to fit within one of the mold halves to at least partially define the article-defining cavity in the closed position of the mold, the first and second porous parts absorbing gas trapped at the first and second exterior surfaces, respectively, of the plastic article immediately adjacent the first and second porous parts, respectively in the closed position of the mold to degas and form the first and second exterior surfaces but preventing the passage of plastic from the article-defining cavity wherein surface defects of the plastic article are reduced and wherein the first and second porous parts release the absorbed trapped gases in the open position of the mold.

9. The assembly as claimed in claim 8 wherein the first and second porous parts are sized and fit within the first and second mold halves, respectively.

10. The assembly as claimed in claim 9 wherein the first and second porous parts substantially fully define the article-defining cavity.

11. The assembly as claimed in claim 8 wherein each of the porous parts comprises a sintered material.

12. The assembly as claimed in claim 11 wherein the sintered material is selected from the group consisting of aluminum, copper, nickel, steel, bronze, porcelain, and brass.

13. A method for making plastic articles having reduced surface defects, the method comprising the steps of:

providing a mold as claimed in claim 1;

processing plastic in the article-defining cavity to form a plastic article;

allowing gases contained within the plastic article to migrate to an exterior surface of the plastic article in contact with the at least one porous mold part during the step of processing, wherein the at least one porous mold part absorbs gases trapped at the exterior surface of the article to degas and form the exterior surface in the closed position of the mold and wherein surface defects of the plastic article are reduced; and opening the mold so that the at least one porous mold part releases the absorbed trapped gases.

\* \* \* \* \*